United States Patent [19]

Burgwald et al.

[11] 3,889,207

[45] June 10, 1975

[54] FREQUENCY STABILIZED GAS LASER

[75] Inventors: Glenn M. Burgwald, Mountain View; William P. Kruger; Donald L. Hammond, both of Los Altos Hills, all of Calif.

[73] Assignee: Hewlett-Packard Company, Palo Alto, Calif.

[22] Filed: May 7, 1973

[21] Appl. No.: 357,752

Related U.S. Application Data

[62] Division of Ser. No. 13,285, Feb. 24, 1970, Pat. No. 3,771,066.

[52] U.S. Cl. ......... 331/94.5 S; 330/4.3; 331/94.5 G
[51] Int. Cl. ........................... H01s 3/10; H01s 3/22
[58] Field of Search ..................... 331/94.5; 330/4.3

[56] References Cited
OTHER PUBLICATIONS

White, The Review of Scientific Instruments, Vol. 38, No. 8, August 1967, pp. 1079–1084.
Mancebo, Proceedings of the IEEE, Sept. 1963, pp. 1250–1251.
Smartt et al., J.S.C.I., Instrum, Vol. 41, 1964, p. 514.
Ramsay et al., Jap. J. of Applied Physics, Vol. 5, No. 10, Oct. 1966, p. 918–920.

*Primary Examiner*—Robert J. Webster
*Attorney, Agent, or Firm*—Roland I. Griffin

[57] ABSTRACT

A rod made of an insulating material having a thermal coefficient of expansion in the range from +1 to −1 part in $10^7$ per degree centigrade is mounted between a pair of mirrors and hermetically sealed either within a glass or a stainless steel enclosure containing a gas discharge medium. The stainless steel enclosure may be clamped to and fixedly spaced from the rod by projections formed on the enclosure and symmetrically disposed around the rod toward the ends of the rod. The mirrors and an annular piezoelectric disc positioned within the enclosure between one of the mirrors and one end of the rod are axially mechanically biased against the ends of the rod either by a spring loading structure or by a gas pressure differential. An anode and an annular cathode electrically insulated from one another for operation at different potentials are mounted toward the opposite ends of the rod. A discharge path communicating with the gas discharge medium and including a portion of a bore axially extending through the rod is provided in the rod between and in communication with the anode and the cathode to provide a gas discharge for excitation of the gas discharge medium to produce a laser beam. This discharge path may be placed in a magnetic field having a component in the direction of the laser beam to Zeeman split the atomic transition line at which the laser action occurs so that the laser oscillates at two different frequencies and thereby produces an output beam with two components of different frequency and polarization. In response to a portion of the laser beam a feedback control circuit changes the thickness of the piezoelectric disc to maintain the spacing between the mirrors as required, for example, to stablize the frequency, or frequencies, of oscillation of the laser at or in a known relationship to the center of the atomic transition line at which the laser action occurs.

7 Claims, 7 Drawing Figures

FREQUENCY STABILIZED GAS LASER

CROSS-REFERENCE TO RELATED APPLICATION

This is a divisional application of U.S. application Ser. No. 13,285 filed on Feb. 24, 1970, by Glenn M. Burgwald, et al., now U.S. Pat. No. 3,771,066 which issued on Nov. 6,1973.

BACKGROUND AND SUMMARY OF THE INVENTION

This invention relates generally to gas lasers and more particularly to improvements therein for increasing their mechanical stability and stabilizing their frequencies of oscillation at or in a known relationship to the center of the atomic transition line at which the laser action occurs.

In the fabrication of many conventional gas lasers, parts of the laser are bonded together by employing epoxy or other such organic bonding agents. These organic bonds are typically not as mechanically stable or gas tight as required to provide a rugged and reliable laser of long life. They also prevent the laser from being baked out at temperatures above 200°C since they are generally not capable of withstanding such high temperatures. This is significant because in the fabrication of a laser bake out at such high temperatures would be useful to reduce gas contamination, clean the structure, and thereby improve the performance, reliability, and useful life of the laser. Furthermore, these organic bonds are themselves a source of gas contamination in the laser even during bake out at lower temperatures and subsequently during normal operation of the laser itself.

Conventional gas lasers are also typically fabricated with a glass or a quartz enclosure and with a cathode structure that is mounted in a side appendage of the enclosure. This side appendage and the main body of the enclosure are typically joined together by a neck-like conduit of smaller diameter. Glass and quartz enclosures are somewhat fragile to begin with, but the addition of such appendages makes them substantially more fragile than they would otherwise be. Moreover, mounting the cathode structure in this manner significantly reduces the ruggedness and mechanical stability of the laser.

In conventional frequency stabilized gas lasers, the mirrors are typically spaced apart by a support block of quartz or some other such material having a thermal coefficient of expansion greater than $\pm 4$ parts in $10^7$ per degree centigrade and by a cylindrical piezoelectric tuning element having a length normally equal to about ten percent of the spacing between the mirrors. Because of the limited tuning range of conventional piezoelectric materials, the cylindrical piezoelectric tuning element is unable to track the combined change in length of the support block and the tuning element itself with temperature as required to stabilize the spacing between the mirrors over the entire dynamic temperature range of the laser from the time the laser is turned on until it reaches its normal operating temperature. Conventional frequency stabilized gas lasers are therefore typically operated in temperature controlled ovens. However, they typically still require warm up times as long as an hour and a half from the time they and their ovens are turned on before the spacing between their mirrors can be stabilized as required, for example, to stabilize their frequencies of oscillation at or in a known relationship to the center of the atomic transition line at which the laser action occurs.

Mechanical instability, gas contamination, sensitivity to temperature gradients and other such factors degrade the performance, reliability, and useful life of a gas laser. Accordingly, one of the principal objects of this invention is to provide an improved gas laser with greater mechanical stability, reduced gas contamination, and reduced sensitivity to temperature gradients.

The ovens and long warm up times typically required for conventional frequency stabilized gas lasers increase the space, set-up time, and cost requirements of many applications of these lasers. Thus, another of the principal objects of this invention is to provide an improved frequency stabilized gas laser that does not require an oven or a warm up time.

These objects are accomplished according to the preferred embodiments of this invention by mechanically biasing a pair of mirrors against the ends of a rod made of an insulating material having a thermal coefficient of expansion in the range from $+1$ to $-1$ part in $10^7$ per degree centigrade. According to one of the preferred embodiments, the mirrors are supported entirely within a glass enclosure containing a gas discharge medium and are axially biased against the ends of the rod by a spring loading structure. However, according to another of the preferred embodiments, the mirrors are supported at the ends of a stainless steel enclosure containing a gas discharge medium and are axially biased against the ends of the rod by a gas pressure differential between the surrounding medium outside the enclosure and the gas discharge medium inside the enclosure. The stainless steel enclosure is clamped to and fixedly spaced from the rod by projections formed on the enclosure and symmetrically disposed around the rod toward the ends of the rod. In either case, an anode and an annular cathode electrically insulated from one another for operation at different potentials are mounted within the enclosure toward the opposite ends of the rod. The annular cathode is concentrically supported on the rod and, in the case of the glass enclosure, is supported in keyed engagement with the rod and spring-loaded to prevent the keyed cathode and rod from rotating within the enclosure. A discharge path communicating with the gas discharge medium and including a portion of a bore axially extending through the rod and a pair of laterally adjoining passageways is provided in the rod between and in communication with the cathode and the anode to provide a gas discharge for excitation of the gas discharge medium to produce a laser beam. The discharge path may be placed in a magnetic field having a component in the direction of the laser beam to Zeeman split the atomic transition line at which the laser action occurs so that the laser oscillates at two different frequencies and thereby produces an output beam with two components of different frequency and polarization. This magnetic field is provided either by an electromagnet or a permanent magnet concentrically mounted on a portion of the enclosure. An annular piezoelectric disc having a length in the axial direction between the mirrors equal to less than one percent of the spacing between the mirrors is positioned within the enclosure between one of the mirrors and one end of the rod. The piezoelectric disc is responsive to a feedback control circuit for maintaining the spacing between the mirrors as required, for example, to stabilize the frequency, or frequencies, of oscillation of the laser at or in a known relationship to the center of the atomic transition line at which the laser action occurs. By employing the combination of a rod with a thermal coefficient of expansion in the range from +1 to −1 part in $10^7$ per degree centigrade and a piezoelectric disc with a length equal to less than one percent of the spacing between the mirrors as the structure for determining the spacing between the mirrors, the change in length of the piezoelectric disc with voltage may be made to track the combined change in length of the piezoelectric disc and the rod with temperature as required to stabilize the spacing between the mirrors over the entire dynamic temperature range of the laser from the time the laser is turned on until it reaches its normal operating temperature. Thus, no oven or warm up time is required, for example, to stabilize the frequency, or frequencies, of oscillation of the laser at or in a known relationship to the center of the atomic transition line at which the laser action occurs.

DESCRIPTION OF THE PREFERRED EMBODIMENTS

Figure 1:
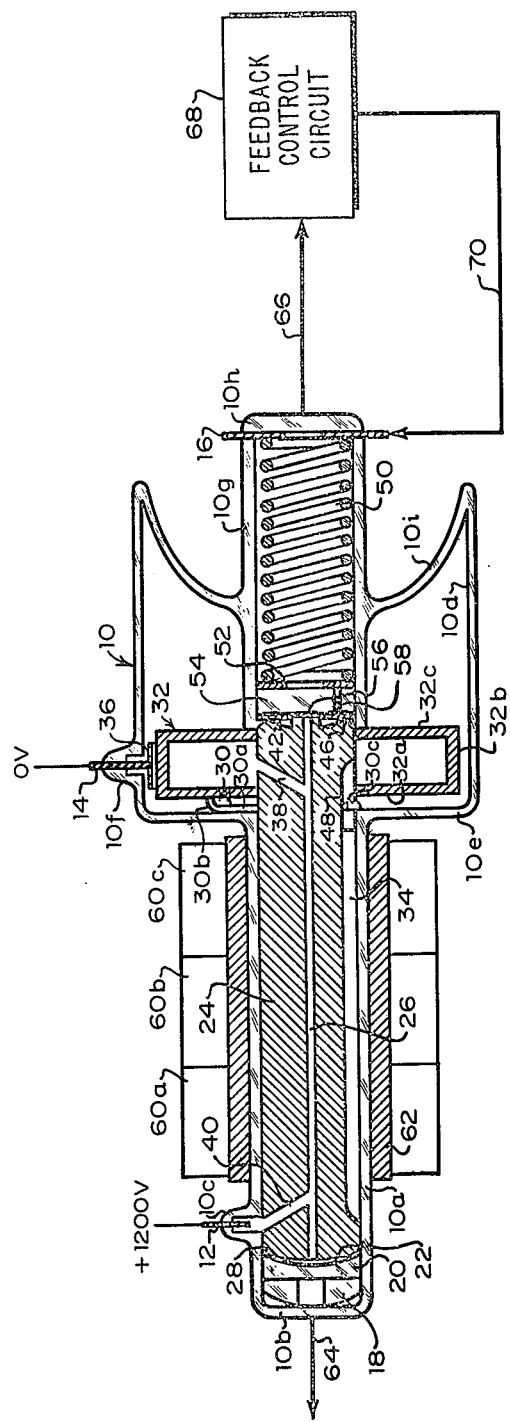
FIG. 1 is a half-sectional elevational view of a gas laser according to one of the preferred embodiments of this invention.

Referring to FIG. 1, there is shown a gas laser with a glass enclosure 10. This glass enclosure is formed in two sections to facilitate assembling the laser. One section includes a cylindrical barrel portion 10a with a closed front end 10b, an open back end, and a bell-shaped protrusion 10c supporting an anode pin 12 toward closed front end 10b. This same section also includes a cylindrical portion 10d of increased diameter with an annular front end 10e adjoining the open back end of barrel portion 10a, an open back end, and a bell-shaped protrusion 10f supporting a cathode contact pin 14 toward annular front end 10e. The other section includes a barrel portion 10g with an open front end, a closed back end 10h supporting a concentric annular contact 16, and a bell-shaped flange 10i for closing the open back end of cylindrical portion 10d and supporting barrel portion 10g in spaced axial alignment with barrel portion 10a. Anode pin 12, cathode contact pin 14, and annular contact 16 are all hermetically sealed in place and are made of an electrically conductive metal having a thermal coefficient of expansion comparable with that of glass (for example, KOVAR) to provide glass-to-metal seals capable of withstanding temperatures as high at 500°C.

An annular glass spacer 18 with a convex front surface (or, alternatively, a pair of oppositely facing annular spring washers, such as BELLVILLE washers), a circular fused silica or glass mirror 20 with a concave reflective surface 22 having a transmittance of about 0.6-0.85 percent at the desired wavelength (for example, 6328A), and a cylindrical rod 24 with an axial bore 26 extending therethrough are loaded into barrel portion 10a through the open back end thereof. Rod 24 is made of an insulating material, such as CER-VIT, having a thermal coefficient of expansion in the range from +1 to −1 part in $10^7$ per degree centigrade. Rod 24 may have, for example, a length of about 5 inches and an outer diameter of about 1 inch. Axial bore 26 may have, for example, a diameter of about forty to forty-five thousandths of an inch. Spacer 18, mirror 20, and rod 24 are axially aligned with the convex front surface of spacer 18 abutting upon closed front end 10b of barrel portion 10a, with a flat mounting surface of mirror 20 abutting upon a flat back surface of spacer 18, and with an annular ridge 28 on the front end of rod 24 abutting upon the concave reflective surface 22 of mirror 20. Annular ridge 28 is formed on the front end of rod 24 by the intersection of convex central and outer annular end surfaces with radii of curvature slightly greater and slightly less, respectively, than the concave reflective surface 22 of mirror 20.

A stainless steel wireform loading spring 30 and a hollow annular aluminum cathode 32 are supported by rod 24 within the cylindrical portion 10d of the glass enclosure. Wireform loading spring 30 comprises a discontinuous wire triangle and is positioned with its three legs 30a abutting upon the annular front end 10e of cylindrical portion 10d and upon different sides of rod 24, with its corners 30b bent laterally outward and abutting upon side 32a of the cathode at three points symmetrically disposed therearound, with its end positioned along one leg and bent laterally outward into engagement with a pair of spaced holes formed in side 32a of the cathode, and with an inwardly projecting portion 30c positioned along another of the legs and engaging a groove 34 formed along one side of rod 24 away from anode pin 12. Wireform loading spring 30 serves the dual function of axially spring loading cathode 32 and keying cathode 32 and rod 24 together to prevent them from rotating relative to one another. This might also be accomplished by forming a shallow flat surface (of a depth about equal to the radius of the wire of wireform loading spring 30) along one side of the rod in place of groove 34, by forming a pair of vertical sawcuts along two other oppositely facing sides of the rod, and by employing a generally square (rather than triangular) discontinuous wireform loading spring 30. The square wireform loading spring is positioned on rod 24 with its corners bent laterally outward and abutting upon side 32a of cathode 32 at four points symmetrically disposed therearound, with its four legs abutting upon different sides of the rod, with two of its legs engaged in the oppositely facing vertical sawcuts of the rod, with another of its legs abutting upon the flat surface of the rod away from anode pin 12, with its ends positioned along this other leg and bent laterally outward along the flat surface of the rod, and with its ends engaged in corresponding semicircular notches formed along the inner periphery of side 32a of the cathode. In either case, a loading spring 36 is engaged between cathode contact pin 14 and the adjoining peripheral side 32b of the cathode to provide an electrical connection between the cathode contact pin and the cathode and to prevent the keyed cathode and rod 24 from rotating relative to glass enclosure 10. Loading spring 36 is made of an electrically conductive spring metal, such as INCONEL, and comprises a bowed rectangular-shaped element with a radius of curvature smaller than that of cathode 32 and with a central indentation for receiving and engaging cathode contact pin 14. This type of cathode structure increases the mechanical stability and ruggedness of the laser.

A passageway 38 formed in rod 24 toward the back end thereof laterally extends between bore 26 and the interior of cathode 32. Another passageway 40 formed in rod 24 toward the front end thereof laterally extends between bore 26 and the interior of bell-shaped protrusion 10c. A discharge path is therefore provided within rod 24 between cathode 32 and anode pin 12 by axial bore 26 and passageways 38 and 40.

An annular piezoelectric disc 42 (having, for example, a length of about forty thousandths of an inch in the axial direction of rod 24) is also supported within the cylindrical portion 10d of glass enclosure 10 by a cylindrical projection at the back end of rod 24. A chromium electrode deposited on a flat front face of piezoelectric disc 42 is placed in abutment upon an annular ridge 46 on the back end of rod 24. Annular ridge 46 is formed on the back end of rod 24 by the intersection of concave central and convex annular end surfaces. The chromium electrode on the front face of piezoelectric disc 42, wireform spring 30, and cathode 32 all abut upon a layer of chromium 48 deposited on the lower rear and back end portions of rod 24. An electrical connection is therefore provided between cathode contact pin 14, cathode 32, and the chromium electrode on the front face of piezoelectric disc 42 by loading spring 36, wireform loading spring 30, and chromium layer 48.

An axial loading spring 50 (or, alternatively, a plurality of oppositely facing annular spring washers, such as BELLVILLE washers), an annular stainless steel contact 52, and a circular fused silica or glass mirror 54 with a flat reflective surface 56 having a transmittance of about 0.05 percent or less at the desired wavelength are loaded into barrel portion 10g through the open front end thereof. Axial loading spring 50, contact 52, and mirror 54 are axially aligned with one end of spring 50 abutting upon a flat front surface of contact 16, with a flat back surface of contact 52 abutting upon the other end of spring 50, and with a flat mounting surface of mirror 54 abutting upon a flat front surface of contact 52. A contact spring 58 is supported in a cylindrical hole formed through mirror 54 toward one side thereof. Contact spring 58 is positioned so that the back end of the spring abuts upon the flat front surface of contact 52 and so that the front end of the spring protrudes beyond the flat reflective surface 56 of mirror 54 when the spring is uncompressed. Axial loading spring 50 and contact spring 58 are both made of an electrically conductive spring metal, such as INCONEL. Both barrel portions 10g and 10a of the glass enclosure are preshrunk on a precision mandrel to an inner diameter only one or two thousandths of an inch greater than the outer diameter of rod 24. Concomitantly, axial loading spring 50 (when compressed), annular contact 52, mirror 54, piezoelectric disc 42, mirror 20, and spacer 18 are all made of the same or a slightly smaller outer diameter than rod 24 so that they may move axially within barrel portions 10a and 10g while being substantially prevented from moving laterally therein.

After the two sections 10a–f and 10g–i of the glass enclosure have been loaded with the internal parts of the laser, as described above, they are positioned with their barrel portions 10a and 10g in spaced axial alignment, with side 32c of the cathode axially spring loaded against the open front end of barrel portion 10g by wireform loading spring 30 and spaced the same distance from the aperture of passageway 38 as side 32a of the cathode, with the reflective surface 56 bearing face of mirror 54 and the front end of contact spring 58 abutting upon a chromium electrode deposited on a flat back face of piezoelectric disc 42, and with axial loading spring 50 axially spring loading mirror 20 against the front end of rod 24 and axially spring loading piezoelectric disc 42, mirror 54, and contact 52 against the back end of the rod. The two sections 10a–f and 10g–i of glass enclosure 10 are then hermetically fused in place by heat sealing bell-shaped flange 10i of section 10g–i to the open back end of cylindrical portion 10d of section 10a–f. This glass bond will withstand temperatures as high as about 500°C. Glass enclosure 10 is then evacuated and filled to a pressure of about 3 to 6 torr with a gas comprising, for example, ten parts helium and one part neon. During the evacuation of the glass enclosure, it is baked out at a temperature of about 250°–400°C to help evacuate the enclosure and to reduce gas contamination and clean the structure within the enclosure. Bake out at these high temperatures is possible because no organic bonds, but only glass-to-glass and glass-to-metal bonds and spring loading, are employed in assembling the laser. Both the evacuation and the filling of the front end of the laser are helped by forming groove 34 (or the corresponding flat surface as described in connection with the square wireform loading spring) along nearly the full length of rod 24 and in communication with both the enlarged cylindrical portion 10d of glass enclosure 10 and the interior of cathode 32. However, this groove (or flat surface) should not extend completely to the ends of rod 24 as it might then serve as a spurious discharge path along the outer periphery of the rod. The volume of gas with which the glass enclosure may be filled at the desired pressure is significantly increased due to the enlarged cylindrical portion 10d of the glass enclosure. Thus, in addition to housing cathode 32, the enlarged cylindrical portion 10d of the glass enclosure serves as a reservoir of gas for increasing the useful life of the laser.

The assembled laser may be operated by applying a potential of about +1200V to its anode 12 while maintaining its cathode 32 at ground potential to provide a gas discharge for excitation of the gas discharge medium to produce a single TEM mode laser light beam. Alternatively, the discharge path of the laser may be placed in a magnetic field having a component of about 300 gauss in the direction of the laser beam to Zeeman split the atomic transition line at which the laser action occurs so that the laser oscillates at two frequencies and thereby produces an output beam having two components with a frequency difference of about 1.5–2.0 megahertz and with different polarizations. For frequency separations sufficiently large that the interactions of the two oscillations are small the polarizations approach left and right circular polarizations. Either an electromagnet or a permanent magnet may be supported around the barrel portion 10a of the glass enclosure between anode 12 and cathode 32 to provide the magnetic field. If a permanent magnet is employed, for convenience in mounting it may comprise three split cylindrical magnet sections 60a–c supported side-by-side on a split collar 62 made of an insulating material such as TEFLON. In any event, a portion 64 of the laser beam passes through mirror 20, annular spacer 18, and the closed end 10b of the glass enclosure and serves as the main output of the laser. Since reflective surface 56 has a lower transmittance than reflective surface 22, a smaller portion 66 of the laser beam passes through annular piezoelectric disc 42, mirror 54, annular contact 52, axial loading spring 50, annular contact 16, and end wall 10*h* of the glass enclosure. This portion serves as an auxiliary output of the laser.

The chromium electrode on the front face of piezoelectric disc 42 is maintained at ground potential with cathode contact pin 14 because of the electrical connection provided therebetween by chromium layer 48, wireform loading spring 30, cathode 32, and loading spring 36. Concomitantly, an electrical connection is provided between annular contact 16 and the chromium electrode on the back face of piezoelectric disc 42 by axial loading spring 50, annular contact 52, and contact spring 58 so that a control voltage ranging from zero to 2500 volts may be applied to the chromium electrode on the back face of the piezoelectric disc. Piezoelectric disc 42 may therefore be employed as a tuning element for spacing the mirrors as required, for example, to set the frequency, or frequencies, of oscillation of the laser at or in a known relationship to the center of the atomic transition line at which the laser action occurs.

A conventional feedback control circuit 68, such as one of those described in U.S. Pat. No. 3,453,557 entitled LASER STABILIZATION APPARATUS and issued on July 1, 1969, to Thomas G. Polanyi, et al., may be employed for controlling the length of piezoelectric disc 42 in the axial direction between mirrors 20 and 54 to maintain the spacing between the mirrors as required, for example, to stabilize the frequency, or frequencies, of oscillation of the laser at or in a known relationship to the center of the atomic transition line at which the laser action occurs. For example, if the laser beam has right and left circularly polarized components, a feedback control circuit 68 like that shown and described in connection with FIG. 7 of the Polanyi, et al. patent may be employed. This circuit comprises a detector responsive to the auxiliary output portion 66 of the laser beam for producing a d.c. feedback voltage proportional to the difference in intensity between the right and left circularly polarized components of the laser beam. The d.c. feedback voltage is applied from the output 70 of the detector through contact 16, axial loading spring 50, and contact 52 to the chromium electrode formed on the back face of piezoelectric disc 42 so that the thickness of the piezoelectric disc is varied to maintain the spacing between mirrors 20 and 54 as required to stabilize the frequencies of oscillation of the laser in a known relationship to the center of the atomic transition line at which the laser action occurs. Another type of feedback control circuit 68 that might be employed in place of the one just described is shown and described in copending U.S. Pat. application Ser. No. 657,857 entitled FREQUENCY STABILIZED LASER SYSTEM, filed on Aug. 2, 1967, by Leonard S. Cutler, and assigned to the same assignee as this patent application.

Conventional piezoelectric materials typically have a thermal coefficient of expansion on the order of about 2 parts in $10^6$ per degree centigrade and a voltage coefficient of expansion on the order of about $25 \times 10^{-6}$ inch per kilovolt. Moreover, they typically change length more rapidly with voltage than they, or insulating materials such as CER-VIT, do with temperature. Thus, for example, by employing the combination of a rod 24 made of CER-VIT or some other such insulating material having a thermal coefficient of expansion in the range from +1 to −1 part in $10^7$ per degree centigrade and a piezoelectric disc 42 having a length in the axial direction between mirrors 20 and 54 equal to less than one percent of the spacing between the mirrors as the structure for determining the spacing between the mirrors the change in length of the piezoelectric disc with voltage may be maintained as great in one direction as the combined change in length of the rod and the piezoelectric disc with temperature in the reverse direction over the entire dynamic temperature range of the laser (roughly, 50° centigrade) from the time the laser is turned on until it reaches its normal operating temperature by applying a d.c. feedback voltage (ranging between zero and 2500 volts) to the piezoelectric disc. For example, a rod 24 having a length of five inches and a thermal coefficient of expansion of one part in $10^7$ per degree centigrade and a piezoelectric disc 42 having a length of 0.040 inch and a thermal coefficient of expansion of two parts in $10^6$ per degree centigrade would have a combined change in length of $29 \times 10^{-6}$ inch over a dynamic temperature range of fifty degrees centigrade. Thus, for a piezoelectric disc 42 having a voltage coefficient of expansion of $25 \times 10^{-6}$ inch per kilovolt and a tuning range of from zero to 2500 volts, a change in feedback voltage of between 1100 and 1200 volts would be sufficient to stabilize the spacing between the mirrors.

Figure 2:
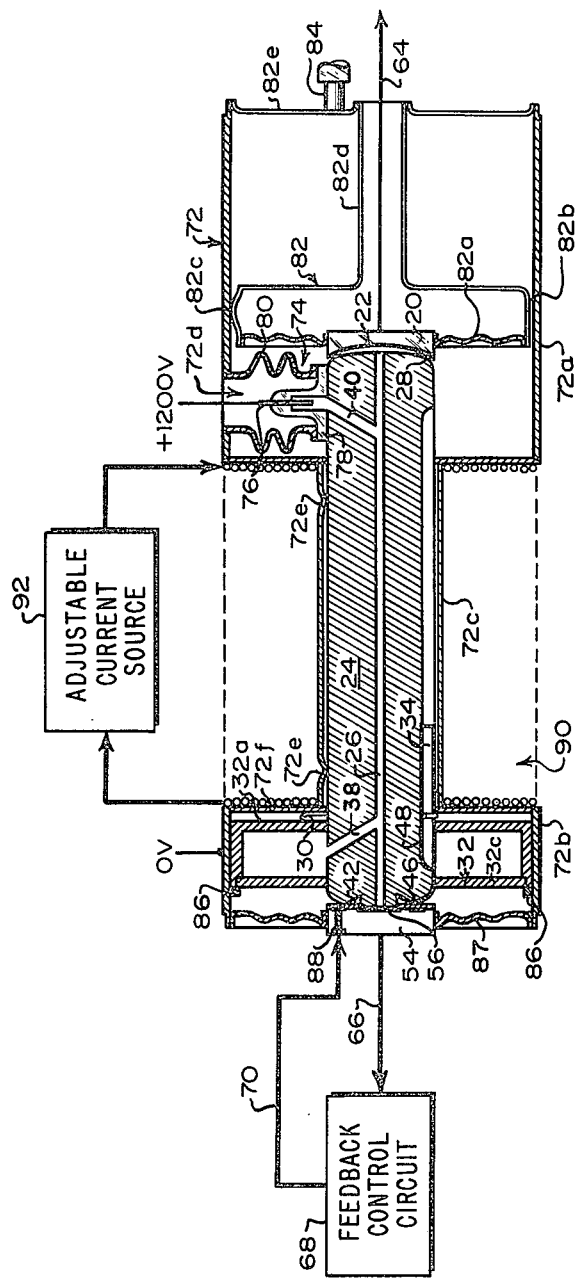
FIG. 2 is a half-sectional elevational view of a gas laser according to another of the preferred embodiments of this invention.

Referring now to FIG. 2, there is shown a gas laser with an enclosure 72 made of a metal such as stainless steel. This metal enclosure has cylindrical end sections 72*a* and 72*b* of the same diameter and a cylindrical intermediate section 72*c* of reduced diameter. It is formed with open ends, with a circular mounting hole 72*d* through one side of end section 72*a* toward intermediate section 72*c*, and with three pairs of inwardly directed projections 72*e* symmetrically spaced around intermediate section 72*c* toward end sections 72*a* and 72*b*. An anode structure 74 is placed within end section 72*a* and inserted into mounting hole 72*d*. This anode structure comprises an anode pin 76 made of a metal such as KOVAR and hermetically supported by a bell-shaped glass support 78. It further comprises a bellows-type loading spring 80 made, for example, of KOVAR (or stainless steel with KOVAR ends). One end of loading spring 80 is hermetically sealed to a flat upper surface of the peripheral lip of bell-shaped support 78, and the other end protrudes through mounting hole 72*d*. Anode structure 74 is temporarily clamped above the path defined by intermediate section 72c to facilitate mounting a cylindrical rod 24 made, for example, of CER-VIT, like that described above in connection with FIG. 1, in intermediate section 72*c*. Rod 24 is made of slightly greater outer diameter than the circle defined by projections 72*e* so that the rod may be fixedly mounted in place by heating intermediate section 72*c*, by positioning the rod in the heat-expanded intermediate section so that the aperture of lateral passageway 40 of the rod is aligned with the interior of bell-shaped support 78, and by subsequently cooling the intermediate section to shrink projections 72*e* of the intermediate section onto the rod. This clamps enclosure 72 to rod 24 while at the same time fixedly spacing enclosure 72 from the rod to minimize the effect of external stresses upon the rod.

The lower surface of the peripheral lip of bell-shaped support 78 conforms to the cylindrical surface of rod 24. Once rod 24 is mounted in place, anode structure 74 is unclamped and loading spring 80 forced downward until this lower surface of the peripheral lip of bell-shaped support 78 is seated on and spring loaded against the rod around the aperture of passageway 40. Anode structure 74 is then fixedly mounted and hermetically sealed in place by welding the open end of loading spring 80 to the peripheral wall of mounting hole 72d. For convenience in fabricating the laser, this weld and the other welds to be described below may all be done at the same time after the laser is completely assembled if the parts to be welded are clamped in place until then. In order to provide greater mechanical stability, bell-shaped support 78 may also be clamped to rod 24. This may be accomplished, for example, by screwing a pair of U-shaped metal straps girdling the rod to the opposite ends of a pair of outwardly bowed yokes straddling the base of anode structure 74 on opposite sides of bell-shaped support 78.

The laser of FIG. 2 also employs a pair of circular glass mirrors 20 and 54 like those described above in connection with FIG. 1. Mirror 20 is mounted and hermetically sealed in place at one end of a mounting structure 82 by an annular support spring 82a attached to the periphery of mirror 20. Both the mounting structure and the support spring may be made, for example, of KOVAR. Mounting structure 82 is fabricated with a cylindrical section 82b having three outwardly directed projections 82c symmetrically spaced therearound, with mirror 20 and annular support spring 82a fixedly mounted and hermetically sealed in place within and at one end of cylindrical section 82b, with another cylindrical section 82d of reduced diameter communicating with the other end of cylindrical section 82b and with the surrounding medium, with an annular flange 82e fixedly mounted and hermetically sealed in place on cylindrical section 82d at the other end of the mounting structure, and with an exhaust port 84 fixedly mounted and hermetically sealed in place in flange 82e. The inner diameter of end section 72a of the metal enclosure is made of a slightly smaller diameter than the circle defined by projections 82c so that mounting structure 82 may be fixedly mounted in place by heating end section 72a, by positioning the mounting structure in the head-expanded end section 72a so that the concave reflective surface 22 of mirror 20 abuts upon the annular edge 28 of the front end of rod 24 and so that flange 82e abuts upon the open end of heat-expanded end section 72a, and by subsequently cooling end section 72a to shrink fit it onto projections 82c of the mounting structure. Flange 82e of the mounting structure is then welded and hermetically sealed in place to the open end section 72a of the mounting structure.

A stainless steel wireform loading spring 30, like one of those described above in connection with FIG. 1, and a hollow annular aluminum cathode 32, like that described above in connection with FIG. 1 (but with an outer diameter about ten to fifteen thousandths of an inch less than the inner diameter of end section 72b of the metal enclosure) are supported on rod 24 within end section 72b. Wireform loading spring 30 is positioned between annular end wall 72f of end section 72b and annular side 32a of cathode 32. However, since rod 24 is clamped against movement by intermediate section 72c, the ends of wireform loading spring 30 need not be engaged with holes or notches in cathode 32. Cathode 32 is axially forced against wireform loading spring 30 until the aperture of lateral passageway 38 of rod 24 is centered between sides 32a and 32c of the cathode and is then permanently fixed in place by positioning stainless steel stop members 86 in abutment with side 32c of the cathode and welding them to the inner wall of end section 72b. Thus, as described above in connection with the laser of FIG. 1, axial bore 26 and passageways 38 and 40 provide a discharge path within rod 24 between cathode 32 and anode pin 76.

An annular piezoelectric disc 42, like that described above in connection with FIG. 1, is also supported within end section 72b of the metal enclosure on the cylindrical projection at the back end of rod 24. Piezoelectric disc 42 is positioned with the chromium electrode deposited on its front face abutting upon annular ridge 46 formed on the back end of rod 24 and, hence, upon chromium layer 48 which is deposited on the lower rear and back end portions of rod 24 and in contact with some of the projections 42e of intermediate section 72c of the metal enclosure. An electrical connection is therefore provided between metal enclosure 72 and the chromium electrode deposited on the front face of piezoelectric disc 42 by chromium layer 48 and the projections 72e in contact therewith. Mirror 54 is supported at the open end of end section 72b of the metal enclosure, positioned in axial alignment with rod 24 and piezoelectric disc 42, arranged with the flat reflective surface 56 bearing face of mirror 54 abutting upon the chromium electrode deposited on the back face of the piezoelectric disc, and fixedly mounted and hermetically sealed in place by welding a resilient annular support member 87 attached to the periphery of mirror 54 to the peripheral wall of end section 72b. A contact pin 88 made of a metal such as KOVAR is hermetically sealed in and through mirror 54 toward one side thereof and positioned in abutment upon the chromium electrode deposited on the back face of piezoelectric disc 42, to provide an electrical connection thereto. In order to insure good electrical contact between contact pin 88 and the chromium electrode deposited on the back face of piezoelectric disc 42, an annular chromium layer may also be deposited on mirror 54 around the reflective surface 56 and in communication with contact pin 88.

Once the laser is assembled, metal enclosure 72 is evacuated and filled with a mixture of helium and neon in the same manner as described above in connection with FIG. 1. This is accomplished by means of exhaust port 84 mounted in flange 82e adjacent to end section 72a of the metal enclosure. Groove 34 and the space between rod 24 and intermediate section 72c of the metal enclosure facilitate both the evacuation and filling of end section 72b of the metal enclosure. Since metal enclosure 72 is filled with the gas discharge medium at a pressure (about three to six torr) lower than that (typically, atmospheric pressure) of the surrounding medium and since mirrors 20 and 54 are each supported with one side in communication with the gas discharge medium inside the metal enclosure and with the other side in communication with the surrounding medium outside the metal enclosure, mirrors 20 and 54 and piezoelectric disc 42 are axially biased against the ends of rod 24 by the pressure differential between the gas discharge medium inside the metal enclosure and the surrounding medium outside the metal enclosure.

The completed laser may be operated to produce a single TEM mode laser light beam with main and auxiliary output portions 64 and 66 by applying a potential of about 1200 volts to its anode 76 and by maintaining its metal enclosure 72 and, hence, its cathode 32 at ground potential. Alternatively, as described above in connection with FIG. 1, the discharge path of the laser may be placed in a magnetic field having a component of about 300 gauss in the direction of the laser beam to Zeeman split the atomic transition line at which the laser action occurs so that the laser oscillates at two frequencies and thereby produces an output beam having two components with a frequency difference of about 1.5–2.0 megahertz and with different polarizations. This magnetic field may be provided either by a permanent magnet, as described in connection with FIG. 1, or by an electromagnet 90 supported around the intermediate section 72c of the metal enclosure and driven by an adjustable current source 92. A feedback control circuit 68, like one of those mentioned or described above in connection with FIG. 1 (but with its output 70 connected to contact pin 88) may also be employed for varying the thickness of piezoelectric disc 42 to maintain the spacing between mirrors 20 and 54 as required, for example, to stabilize the frequency, or frequencies, of oscillation of the laser at or in a known relationship to the center of the atomic transition line at which the laser action occurs. Either of the lasers described above might be usefully employed, for example, in an interferometric system for measuring velocity or length, such as that described in U.S. Pat. No. 3,458,259 entitled INTERFEROMETRIC SYSTEM and issued on July 29, 1969, to Alan S. Bagley, et al.

We claim:

1. A gas laser comprising:
   means for enclosing a gas laser medium;
   a rod of insulating material having a thermal coefficient of expansion in the range between +2 and −2 parts in $10^7$ per degree centigrade and having a channel formed therein to define a gas discharge path in said gas laser medium, said channel having a pair of oppositely facing openings communicating with opposite ends of said rod;
   a pair of electrodes supported in communication with opposite end portions of said channel and insulated from each other for operation at different potentials to excite said gas laser medium to produce a population inversion therein;
   a pair of optical elements supported adjacent to the oppositely facing openings of said channel for at least partially reflecting said radiation produced by the population inverted medium in said channel to produce a coherent radiation beam;
   a tuning element supported between one end of said rod and one of said optical elements for controlling the spacing between said optical elements, said tuning element having a length in the axial direction between said optical elements equal to less than ten percent of the spacing between said optical elements; and
   means for energizing said tuning element.

2. A gas laser as in claim 1 wherein one of said electrodes comprises a hollow cathode electrode completely supported upon and around said rod and in communication with one end portion of said channel.

3. A gas laser as in claim 2 wherein:
   said rod has a thermal coefficient of expansion in the range from +1 to −1 part in $10^7$ per degree centigrade;
   said tuning element has a length in the axial direction between said optical elements equal to less than ten percent of the spacing between said optical elements; and
   means is supported around said rod between said electrodes for producing a magnetic field with an axial component in the direction of the beam of radiation produced by the gas discharge in said channel to produce a beam of radiation with two components of different frequency and polarization.

4. A gas laser as in claim 1 wherein:
   said tuning element is responsive to a control signal for changing the spacing between said optical elements by as much in one direction as it changes in the opposite direction with temperature over the dynamic temperature range of the laser from the time the laser is turned on until it reaches its normal operating temperature.

5. A frequency stabilized gas laser as in claim 4 wherein:
   said optical elements are supported against opposite ends of a spacing structure; and
   said tuning element is supported between one end of said spacing structure and one of said optical elements, the change in length with control signal of said tuning element being at least as great in said one direction as the combined change in length with temperature of said tuning element and said spacing structure in said opposite direction, and the rate of change in length with control signal of said tuning element also being at least as great in said one direction as the combined rate of change in length with temperature of said tuning element and said spacing structure in said opposite direction.

6. A frequency stabilized gas laser as in claim 5 wherein:
   said spacing structure comprises a rod of insulating material, said rod having a channel therein for defining the gas discharge path;
   said optical elements comprise a pair of mirrors supported against opposite ends of said rod adjacent to the oppositely facing ports of said gas discharge path; and
   said tuning element comprises a piezoelectric disc supported between one end of said rod and one of said mirrors, the change in length with voltage of said piezoelectric disc being at least as great in said one direction as the combined change in length with temperature of said piezoelectric disc and said rod in said opposite direction, and the rate of change in length with control signal of said tuning element also being at least as great in said one direction as the combined rate of change in length with temperature of said peizoelectric disc and said rod in said opposite direction.

7. A frequency stabilized gas laser as in claim 6 wherein:
   said rod has a thermal coefficient of expansion in the range from +1 to −1 part in $10^7$ per degree centigrade; and
   said piezoelectric disc has a length in the axial direction between said mirrors equal to less than ten percent of the spacing between said mirrors.

* * * * *